(12) United States Patent
Vicharelli et al.

(10) Patent No.: US 7,171,210 B2
(45) Date of Patent: Jan. 30, 2007

(54) METHOD AND APPARATUS FOR NETWORK PLANNING

(75) Inventors: Pablo A. Vicharelli, Carlisle, MA (US); Pete A. Boyer, Somerville, MA (US); David F. Freeman, Billerica, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1379 days.

(21) Appl. No.: 09/736,822

(22) Filed: Dec. 14, 2000

(65) Prior Publication Data

US 2001/0041565 A1 Nov. 15, 2001

(51) Int. Cl.
*H04Q 7/20* (2006.01)

(52) U.S. Cl. ............... 455/446; 455/422.1; 455/67.11; 455/423

(58) Field of Classification Search ............. 455/67.16, 455/67.11, 453, 446, 443, 444, 402.1, 414.1, 455/504, 503, 422.1, 506, 192.1, 179.1, 525; 701/207, 208, 200; 340/988, 990, 995.1
See application file for complete search history.

(56) References Cited

U.S. PATENT DOCUMENTS

| | | | | |
|---|---|---|---|---|
| 5,390,339 A | | 2/1995 | Bruckert et al. ......... 455/67.16 |
| 5,561,841 A | * | 10/1996 | Markus ....................... 455/446 |
| 5,710,758 A | | 1/1998 | Soliman et al. ............. 370/241 |
| 5,732,354 A | | 3/1998 | MacDonald ................. 455/524 |
| 5,799,005 A | * | 8/1998 | Soliman ..................... 370/335 |
| 5,878,034 A | | 3/1999 | Hershey et al. ............. 370/321 |
| 5,926,765 A | | 7/1999 | Sasaki ........................ 455/457 |
| 5,953,661 A | | 9/1999 | Schwinghammer et al. 455/423 |
| 6,021,316 A | * | 2/2000 | Heiska et al. ............. 455/67.16 |
| 6,308,071 B1 | * | 10/2001 | Kalev .......................... 455/446 |
| 6,389,294 B1 | * | 5/2002 | Sipila ......................... 455/506 |
| 6,466,797 B1 | * | 10/2002 | Frodigh et al. .......... 455/456.1 |
| 6,636,742 B1 | * | 10/2003 | Torkki et al. ............ 455/456.1 |

* cited by examiner

*Primary Examiner*—Jean Gelin

(57) ABSTRACT

A system and method for wireless network planning utilizing raster data, stored and manipulated in raster data planes (204–212) and vector data (522) stored and manipulated in vector data planes (528–532). The invention increases the accuracy of network planning by simultaneously utilizing vector data planes (528–532) and raster data planes (204–212) to perform computations using vector features contained within map pixels (604). The disclosed method makes it possible to perform accurate computations such as propagation loss to vector points (602) contained within map pixels (604). Accuracy is further increased because other characteristics such as received power, elevation, and best server can be computed to the vector features rather than processing them with traditional raster resolutions.

14 Claims, 14 Drawing Sheets

METHOD AND APPARATUS FOR NETWORK PLANNING

FIELD OF THE INVENTION

The present invention generally relates to network planning and more particularly to handling vector data for wireless network planning.

BACKGROUND OF THE INVENTION

Wireless communications systems are used to satisfy a variety of mobile voice and data communication needs. Currently, there is demand for additional wireless capabilities so that customers can expand their use of wireless communication devices. This demand is forcing wireless service providers to expand their networks at a rapid rate. The mobility of wireless communication users complicates the deployment of additional network infrastructure such as base stations.

Wireless networks are complex because the infrastructure is often spread over large geographic regions, wireless signals are attenuated as a function of distance, and wireless traffic is not evenly distributed over the served region (e.g. wireless traffic is often clustered into defined areas such as along roadways). Network engineers model wireless networks before deploying system hardware to ensure complete signal coverage and adequate channel capacity. Currently, computer based planning tools are used to perform the complex computations necessary for modelling a wireless network. These models use digitized map databases, geographic coordinates, terrain data, and feature data in an attempt to account for important design constraints. However, the use of digitized map databases undesirably limits the accuracy of computerized network planning.

Since digital maps represent sampled data, there is a spacing between adjacent sample points. The area between each sample point is referred to as a map pixel. The size of each map pixel varies based on the sample spacing used. For example, the area of each map pixel is approximately 90 meters north-south by 70 meters east-west for a 3 arc second USGS map, which is normally used for wireless network planning. Current planning tools use the map pixel as the smallest unit of reference; therefore, features smaller than a map pixel in one dimension are not accurately interpreted. Several types of features used in wireless network planning are smaller than a map pixel in one dimension. Accurately modelling the distance to these features is desirable. Features smaller than a map pixel in one dimension are normally referred to as vectors, with roads and county boundaries being among the most common vector types encountered in wireless network planning.

FIG. 1 illustrates a road 104 traversing map pixels 102. The shaded pixels indicate how the road is perceived after it is rasterized. It can be seen in FIG. 1 that the road value is attributed to the entire pixel even though the road only touches a portion of the pixel. Attributing the road attribute to the entire pixel introduces errors. The errors introduced by using map pixels as the smallest measurement unit are especially problematic when performing propagation loss calculations to points located along a vector. For example, if a car is on a narrow road running through the middle of a map pixel, a propagation calculation to the road can only be computed to an edge of the map pixel containing the road. In addition, other information such as elevation and land-use-land-cover (LULC) are averaged across the entire map pixel, further introducing errors. Thus, the road 104 is not modeled accurately enough to achieve optimum results.

Therefore, a need exists for more accurately computing distances to points along vectors when performing network planning. Furthermore, computing the distance to vector features should not overly burden data storage systems by generating excessive data points.

SUMMARY OF THE INVENTION

It is an advantage of the present invention that a system and method are provided for incorporating the accuracy of vector data into network planning without incurring the penalties realized when all pertinent data is treated with the same granularity. The disclosed invention makes it possible to perform accurate distance dependent propagation loss calculations to vector features located within map pixels. Furthermore, the present invention surpasses current art methods when modelling transient roadway events, such as traffic jams.

The above and other advantages of the present invention are carried out in a network planning system where many input and output variables are required and computed. Variables are stored in data planes which are indexed by geographical location. The use of data planes makes it possible to store non-vector data and vector data with separate granularities while using a single geographical coordinate system. Some examples of non-vector data which are also common to vectors are base elevation and terrain. Data common to vectors and non-vectors is only stored in a single data plane. In contrast, variables unique to each data type are stored in the respective data planes. An example of a variable unique to vector data planes is width. Keeping unique variables in the respective data plane ensures that other processes, such as display system processing and computations, can determine when a specific variable should be accounted for.

BRIEF DESCRIPTION OF THE DRAWING

A more complete understanding of the present invention may be derived by referring to the detailed description and the claims when considered in connection with the Figures, wherein like reference numbers refer to similar items throughout the Figures, and:

DETAILED DESCRIPTION OF THE PREFERRED EMBODIMENTS

A typical wireless network consists of at least one base station (BSS), or cell site, associated with a specific geographic location within the service area. Cell sites can be further divided into macro cell or micro cell sites depending on the antenna height and area served. The present invention can be used for planning macro and micro cells; however, descriptions of the invention and preferred embodiments will be discussed in the context of the more general macro cells. Often a BSS contains more than one antenna in order to serve a larger area. When more than one antenna is used, each antenna serves a particular area, known as a sector, around the BSS location. In situations where signals from more than one antenna reach a particular location within the BSS service area, the antenna producing the stronger signal at the measured location is referred to as the best server.

Maps

Line-of-sight (LOS) from BSS to mobile receiver is required for signal reception; therefore, network planners must take into account terrain features, land-use-land-cover (LULC), population density, foliage, etc. Since BSS locations, mobile receiver locations, elevations, and land use features can be uniquely identified by geographic location, representing these features of interest on geographic maps is convenient. Rasterized maps are used to display feature data on a general purpose computer system using the disclosed method. Any type of rasterized map database can be used; however, for cellular network planning most network planners use the USGS 3 arc second database. The 3 arc second database provides a reasonable compromise between database size and geographic location resolution. Rasterized maps consist of sampled data with the area between each sample point referred to as a map pixel. A map pixel is the smallest unit of resolution for a given set of digitized map data. As previously noted, each map pixel is approximately 90 m N-S×70 m E-W for a 3 arc-second raster map.

When performing computerized wireless network planning, it is helpful for planners to have a comprehensive display capability so that various information types can be displayed simultaneously. For example, a comprehensive display allowing the network planner to view BSS locations, terrain features, population density, and road locations at the same time allows the planner to quickly comprehend the results of a given network configuration. The present invention produces comprehensive displays by creating multi-dimensional maps. The multi-dimensional maps are produced by manipulating multiple data types (variables) relative to a reference to produce a meaningful display.

Raster Data Planes

Figure 1:
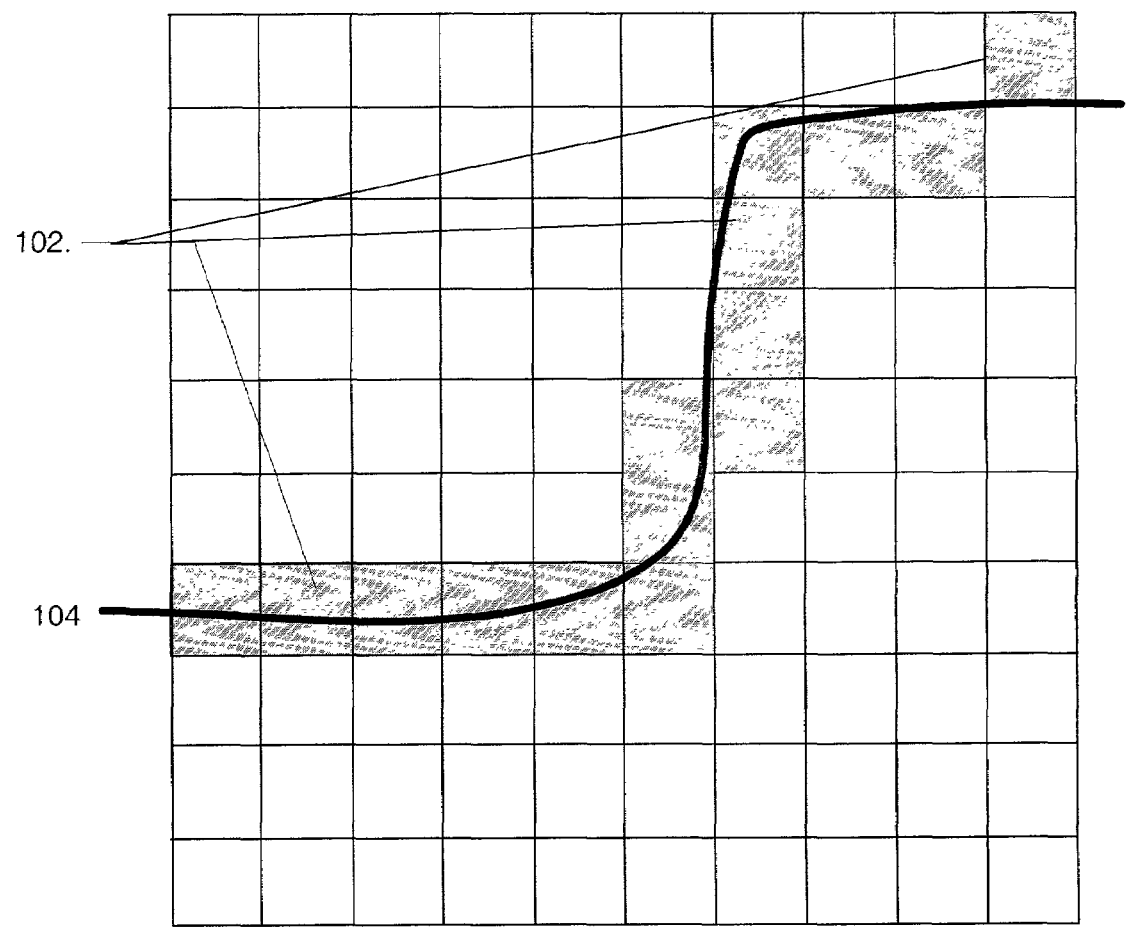
FIG. 1—is an illustration showing a prior art method of rasterizing a road.
Figure 2:
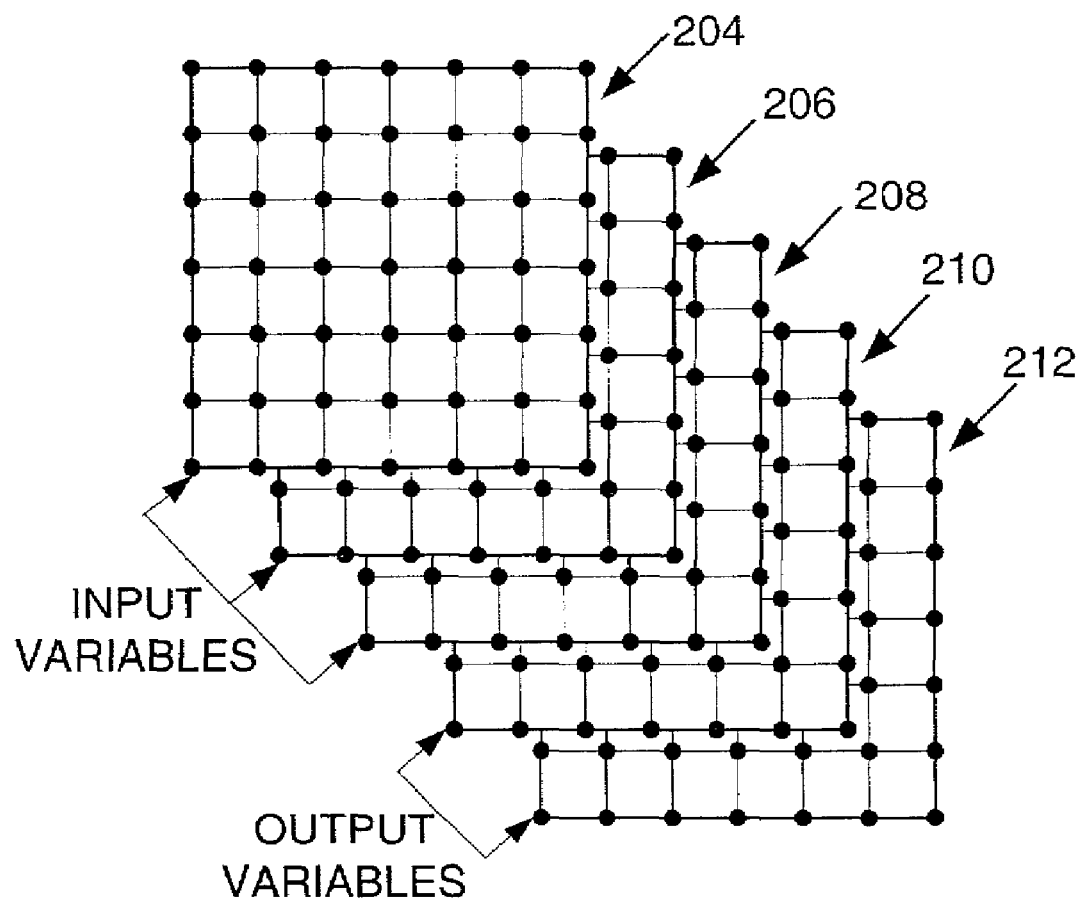
FIG. 2—is an illustration of data planes as used by the present invention.

FIG. 2 illustrates raster data planes, hereinafter referred to as data planes, as used by the present invention. Data planes are used to produce multi-dimensional maps. Typically, data planes are comprised of regularly arranged points corresponding to a rectangular grid. These data planes are assigned such that each variable is represented by a single plane. Some data planes may contain input variables such as elevation 204, land cover 206, and land use 208 which are required to compute a radio plan. Others data planes contain output variables such as best server 210, and received power 212. Additionally, a user can create data planes containing other user-defined variables as needed to facilitate a given wireless planning task. To minimize storage requirements, variables common to more than one data plane are only stored in one of the data planes. For example, if the elevation variable is used by both a road data plane and a terrain data plane, it will only be stored in one data plane and made accessible to other data planes requiring the information.

Figure 3:
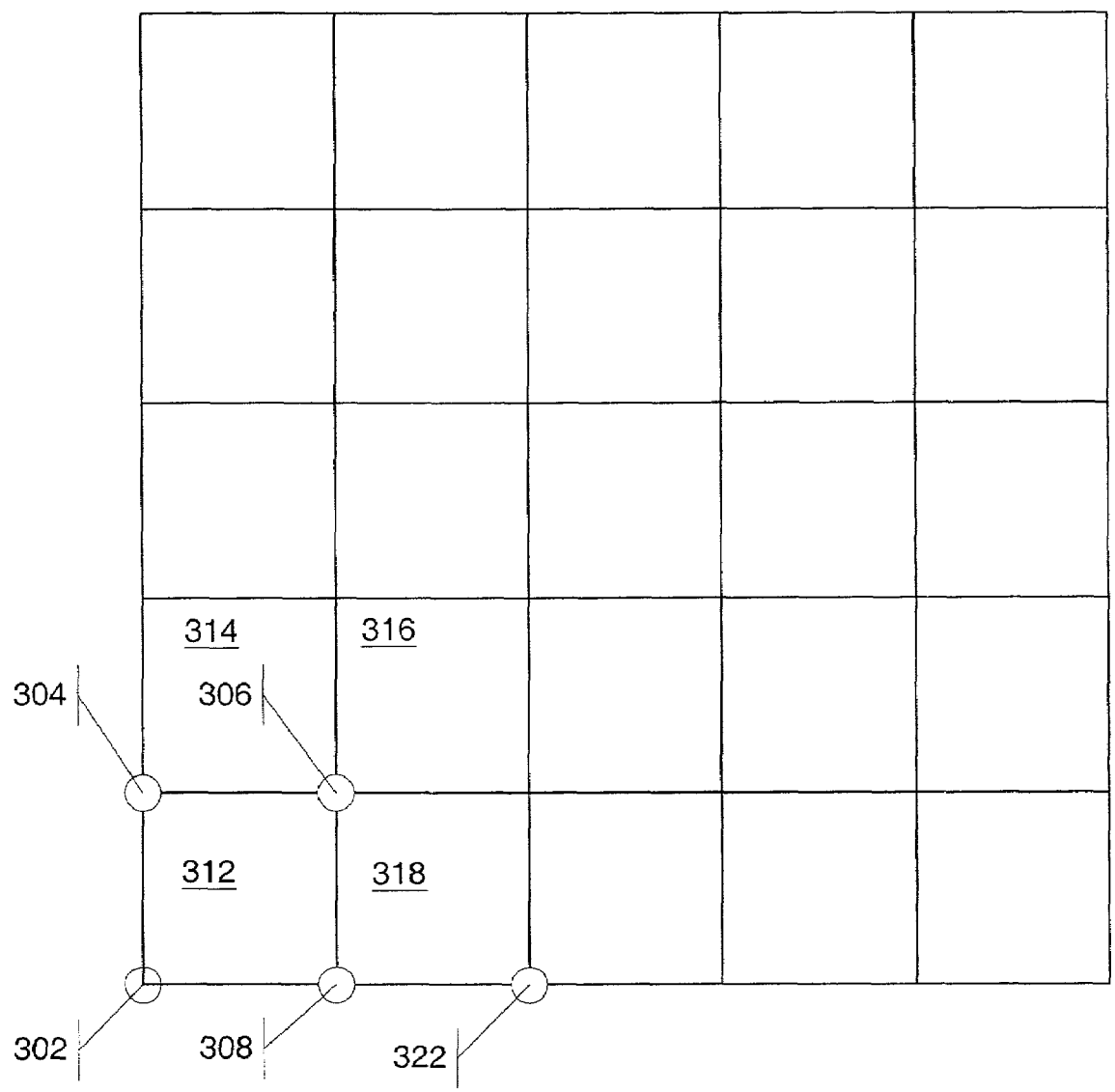
FIG. 3—illustrates a method for identifying map pixels using a unique identifier.

FIG. 3 illustrates a technique used in the present invention for identifying map pixels using unique points. Unique points are used to identify map pixels in the following discussion, however persons knowledgeable in the art will readily comprehend that other methods can be used to identify map pixels without departing from the spirit of the disclosed invention. FIG. 3 contains uniform map pixels 312, 314, 316, and 318. Note that the south-west corner of each map pixel has been selected as the unique identification point. Using the southwest corner to identify each map pixel produces the following relationships: corner 302 is used to identify map pixel 312, corner 308 is used to identify map pixel 318, and corner 304 is used to identify map pixel 314.

Exemplary Display Using Data Planes

Figure 4:
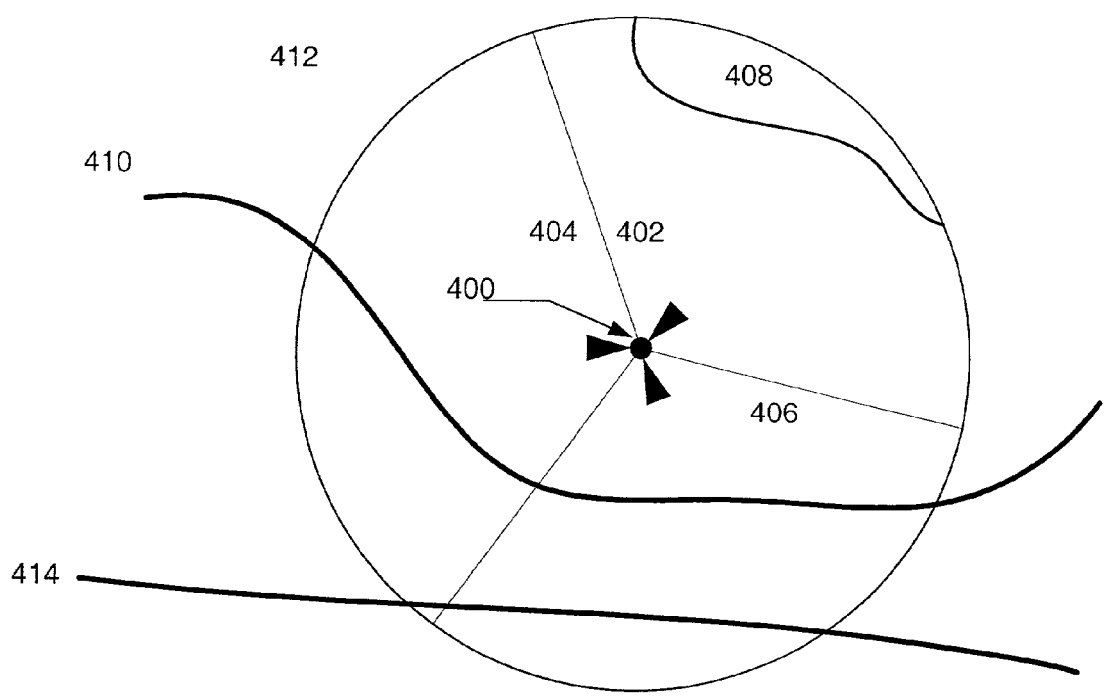
FIG. 4—is an illustration of a comprehensive display created using data planes.

FIG. 4 presents a representative display requiring the use of multiple data planes. A base station 400 is shown having three antennas which form three sectors having best server areas 402, 404, and 406, respectively. The land use within the entire served area 412 is uniform except for water body 408. In addition, features of interest, namely roads 410 and 414 are shown. Although multiple data planes are used to represent the data, overall accuracy of network planning is not enhanced without additional processing. The mere use of data planes does not enhance accuracy because all data such as LULC, population density, and wireless traffic density are represented as an average value for an entire map pixel. For example, a single point located on highway median strip would have the same population density value as the inhabited areas adjacent to the highway if resolution is limited to the area of a map pixel.

The present invention makes it possible to accurately compute the distance to, and properties of, intra-pixel features. The foregoing discussions will detail correct processing of vector data; however, it will be apparent to those skilled in the art that the techniques disclosed herein can be used on other intra-pixel features without departing from the spirit of the invention.

Vectors Generally

Figure 5:
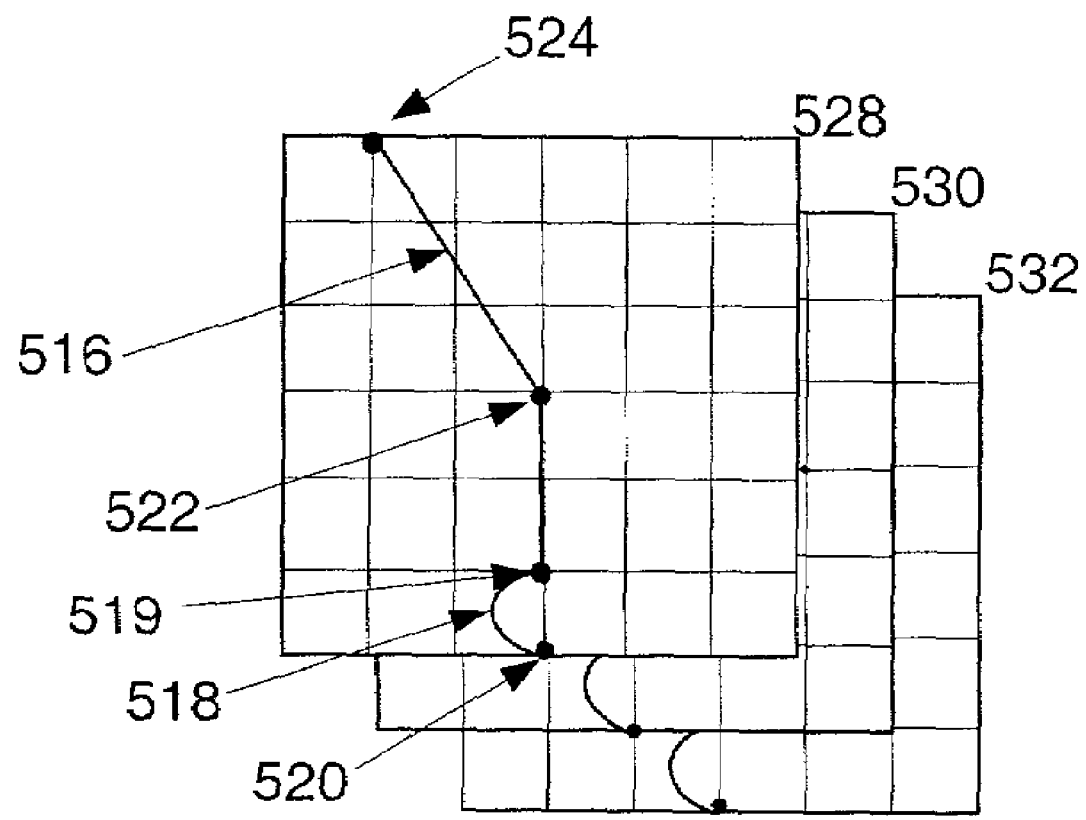
FIG. 5—is an illustration showing generation of vectors on data planes.

FIG. 5 illustrates the definition of a feature as a set of points connected by straight lines. A vector 516 was created by connecting points 519, 520, 522 and 524, respectively. Data storage requirements associated with vectors are optimized by storing the minimum number of points required to adequately represent the particular vector. For example, if a vector feature makes a tight turn, the points used to denote it will be close together 518. For a vector feature that runs straight, the points can be far apart 516.

To accommodate vector features of varying width, a separate input variable is used to specify the width of the vector feature. In general, the database used to store vector features is smaller in size than the map pixel database because most map pixels will not contain roads, land boundaries, or other features which are represented by vectors. However, if vector features are complex, the vector database can be made larger to accommodate more detail than is required for storing map pixels.

Vectors and Data Planes

The variables associated with vectors are organized as a set of webbed data planes, as shown in FIG. 5, one plane per variable. Three data planes are shown in FIG. 5, namely coordinate 528, relative elevation 530 and best server 532. When the same coordinate system is used for both the map pixel data planes and the vector data planes, vectors can be visually and logically superimposed for both display to the network planner and for computer calculations. When practicing the disclosed invention, there is no requirement that the granularity of the vector and map pixel planes be coordinated.

Figure 6:
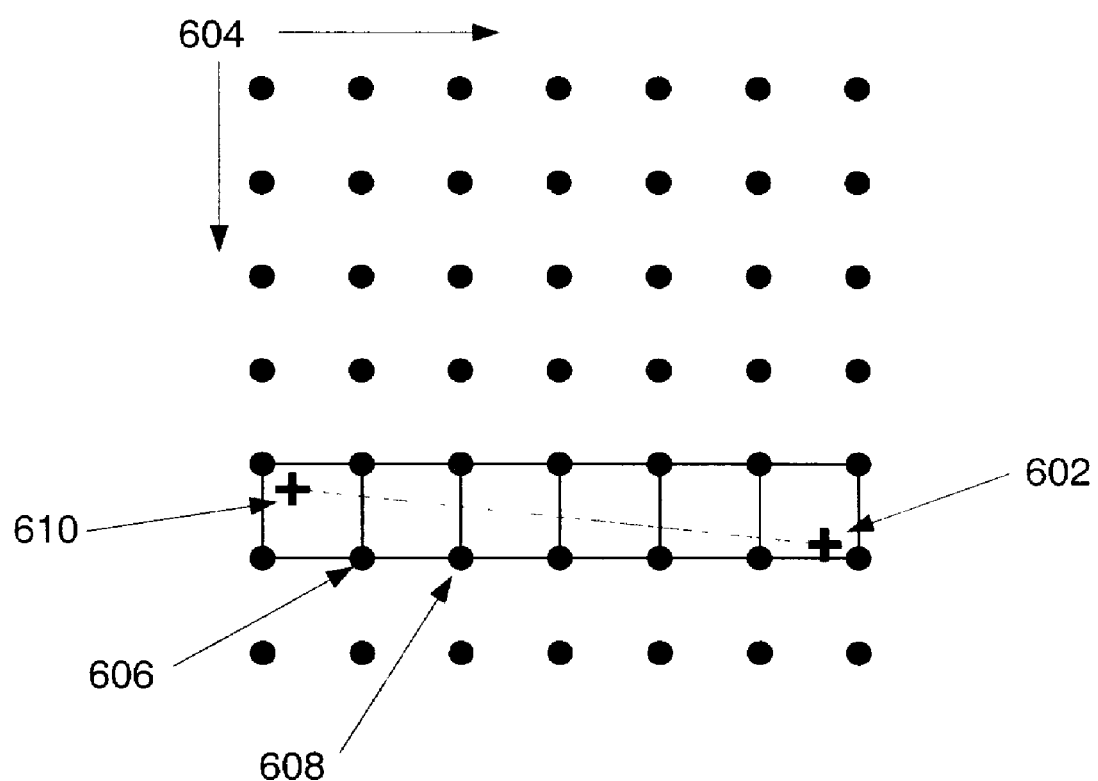
FIG. 6—is an illustration showing superposition of vector points on a grid of map pixels.

FIG. 6 shows a superposition of two vector points 602 and 610 on a grid of map pixels 604. There is no need to store a vector point at map pixel 606 or 608 because points 602 and 610 are connected by a straight line. Any vector values needed for calculations within those map pixels can be derived by interpolation. For instance, if the vector points represent a road that is 10 m above the surrounding terrain, the elevation of the road in map pixel 606 will be 10 m above the terrain of that pixel. Accurately representing vector features is critical to producing realistic wireless network plans using computerized planning systems.

Exemplary Steps for Wireless Planning

Figure 7:
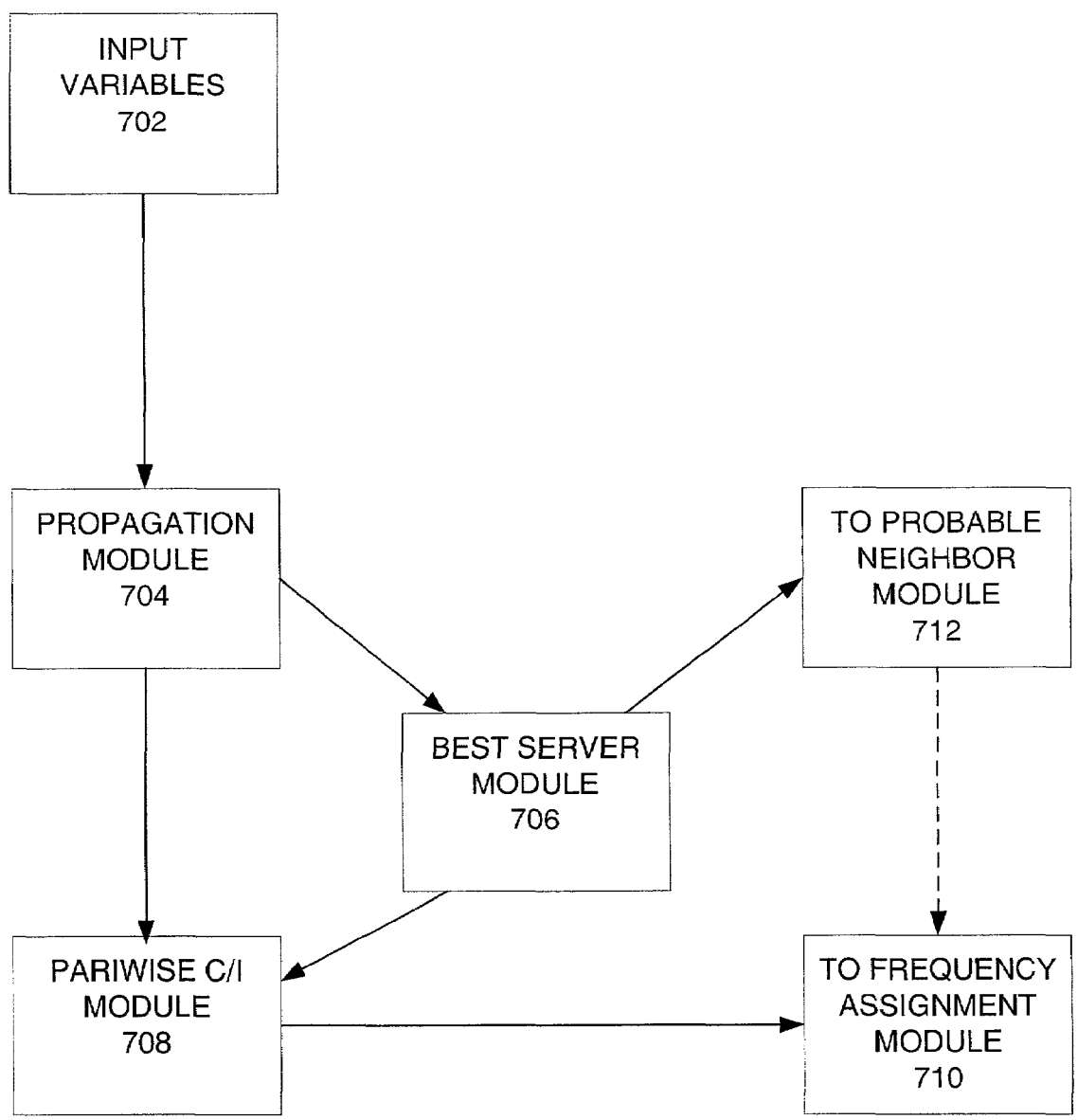
FIG. 7—illustrates a flow diagram of steps used in wireless network planning.

FIG. 7 shows the major steps used for wireless network planning. Here it is noted that additional steps can be added to the diagram of FIG. 7 without departing from the spirit of the disclosed invention. Step 702 uses input variables, including geographic data and user specified operating constraints. The information inputted in step 702 is used by a propagation module (step 704) to compute the expected signal strength at each map feature, including vector features. The propagation calculation is performed at least once for each base station in the coverage area. If vector features are not present in a particular pixel, traditional raster processing is performed. When one or more vector features are present in the pixel being processed, the vector processing as disclosed herein is used. The output of the propagation module (step 704) feeds the best server module (step 706). The best server module (step 706) selects the base station that should be serving each map pixel. In the event that more than one base station is serving a particular map pixel, the best server module (step 706) selects the base station producing the strongest signal at the map pixel and assigns the received signal to that base station. The output of the propagation module (step 704) and the best server module (step 706) are inputted to the pairwise Carrier-to-Interference (C/I) module (step 708). The output of the C/I module (step 708) is inputted to the frequency assignment module in step 710. The frequency assignment module (step 710) performs the assignment of frequencies to particular channels within the network. In FIG. 7, best server module (step 706) is shown outputting data to probable neighbor module (step 712). The dashed line connecting the output of step 712 to step 710 is used to indicate that the respective connection can be eliminated if desired.

Propagation Loss Generally

An important result of wireless network planning is the determination of expected signal-to-noise ratios for all possible mobile receiver locations within the service area. As previously mentioned, accurately predicting the distance dependent propagation loss to locations within the service area is essential to producing an accurate wireless plan. Many methods exist for computing the propagation loss; however, a generalized form can be written in dB units as $$P_{receiver} = P_{transmit} + G_{base} - L + G_{mobile};\qquad\text{Eq. 1}$$

where $P_{receiver}$=power at the mobile receiver
$P_{transmit}$=transmit power of the base station
$G_{base}$=base station antenna gain
L=propagation path loss, a positive quantity
$G_m$=mobile station antenna gain $P_{transmit}$, $G_{base}$, and $G_m$ are design quantities. As such, $P_{transmit}$, $G_{base}$, and $G_m$ can be chosen by the network designer.

Propagation path loss, L, is computed for a particular base station to mobile receiver geometry. A general equation for the propagation path loss at a particular receiver location can be written as $$L = L_{basic} + L_{obstacle} - G_{slope} - G_{water} + L_{rain};\qquad\text{Eq. 2}$$

where L=total propagation path loss at a particular receiver location
$L_{basic}$=computed losses using a basic propagation model
$L_{obstacle}$=loss attributable to obstacles in the LOS path between the base station and receiver
$G_{slope}$=gain attributable to terrain slope at receiver location
$G_{water}$=gain attributable to water's surface in vicinity of receiver
$L_{rain}$=loss attributable to rain falling in LOS path between base station and receiver $L_{basic}$ has the largest impact on the final result. $L_{basic}$ represents the LOS distance dependent propagation loss as the transmitted signal travels through air. Several types of models are known and used in the art to compute $L_{basic}$ such as the Longley-Rice and Okumura-Hata models, and any of them can be used with the present invention. Since $L_{basic}$ is distance dependent, it is important that the network designer accurately identify the distance between the base station location and potential mobile receiver locations for every point within the wireless network area.

Radial Signal Paths

Figure 8:
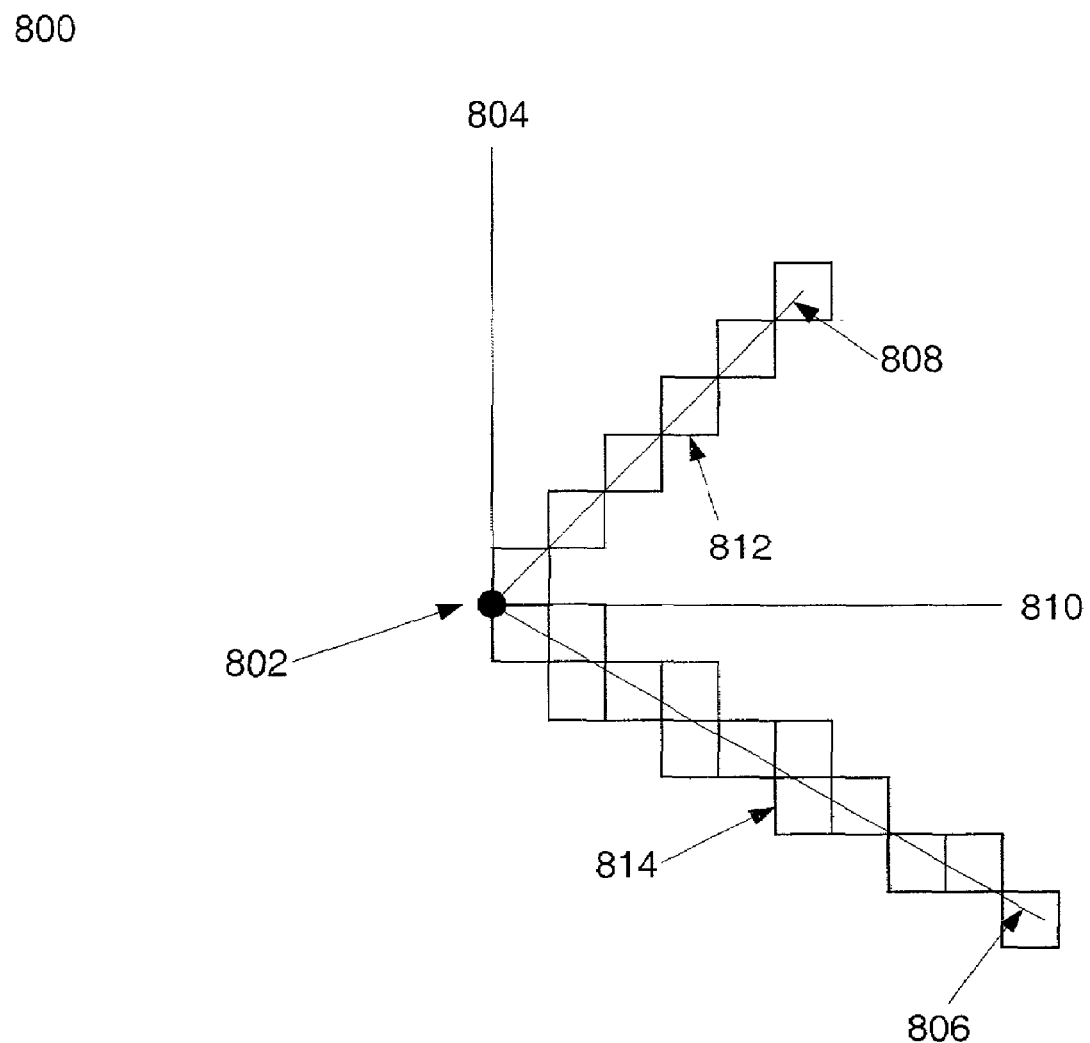
FIG. 8—is an illustration showing radial signal paths for map pixel display.

FIG. 8 shows multiple radial signal paths represented on a map pixel background 800. The disclosed method makes it possible to compute the actual distance from a BSS to any point on a vector, thus producing increased accuracy for the distance dependent propagation calculation. Computing propagation loss begins with establishing radials from a BSS to a desired location pixel. Radials are shown in FIG. 8 as paths 804, 806, 808 and 810. The radials are traced along straight lines emanating from the BSS 802 to various mobile antenna locations. The map pixel background, or alternatively pixel map, can be thought of as a grid with the radials approximated by a sequence of map pixels 812 and 814.

The path loss calculations are very complex and time consuming; therefore, techniques are employed to minimize computation times. For example, the result of each raster path loss calculation is saved as a map pixel output variable.

Once the path loss for a particular map pixel has been calculated and stored, it will not be recomputed if another radial passes through it. Instead the stored value will be used again for subsequent radials passing through that pixel.

Variables Used in Propagation Modelling

After the radials are computed against the map pixel background, input variables and calculation parameters are used to further enhance the path loss calculation associated with each map pixel. The variables for each map pixel are retrieved from the appropriate data planes. Some examples of common input variables and calculation parameters are shown in Table 1; however, other input variables and calculation parameters can also be used.

TABLE 1

Propagation Path Loss Calculation Inputs

| Input/pixel | Calculation Parameters |
| --- | --- |
| Terrain Elevation | Model To be Used |
| Location | Transmitter Height |
| Land Use/Cover | Mobile Antenna Height |
| Attenuation for Land Use | Frequency |
| Average Height for Land Use | Resolution Desired |
| Height of Obstacles | Window width for Effective Antenna Height |
| Orientation of Road Pixels | Window width for Average Land Use |
|  | Road Orientation Angle Tolerance |

Exemplary Propagation Loss Geometry

Figure 9A:
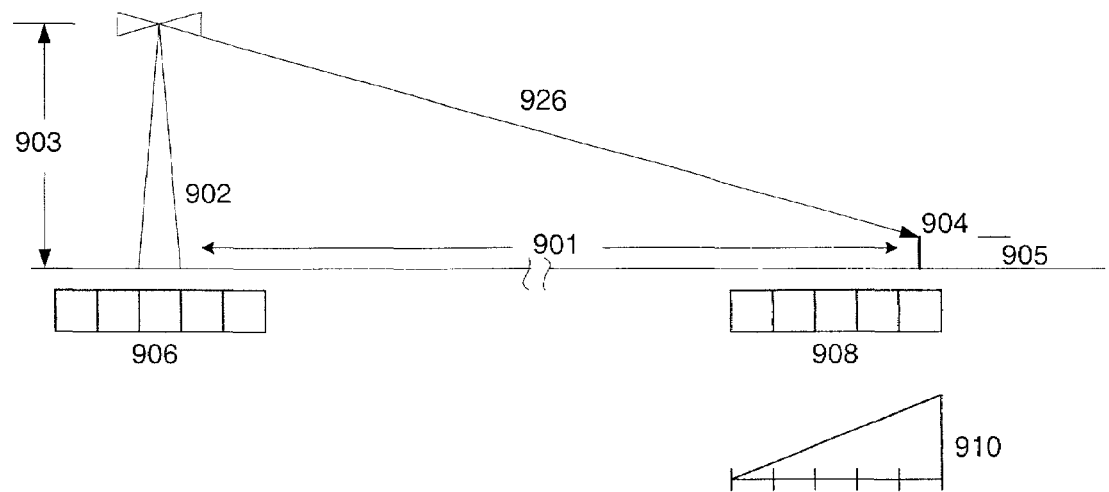
FIGS. 9A and 9B—illustrate a pixel representation of a propagation path loss calculation.

FIGS. 9A and B illustrate the relationships for some of the parameters identified in Table 1. In FIG. 9A, a base station (BSS) 902 having an antenna height 903 sits at a particular elevation. The BSS elevation is computed as an average of the elevation of map pixels 906 surrounding the location of BSS 902. A mobile unit 904, having a mobile antenna height 905 is located a radial distance 901 away from base station 902. The attenuation factor selected is based on the land use at the mobile unit's location. The land use at the mobile unit's location is calculated using the land use average window 908 and a weighting function 910.

Figure 9B:
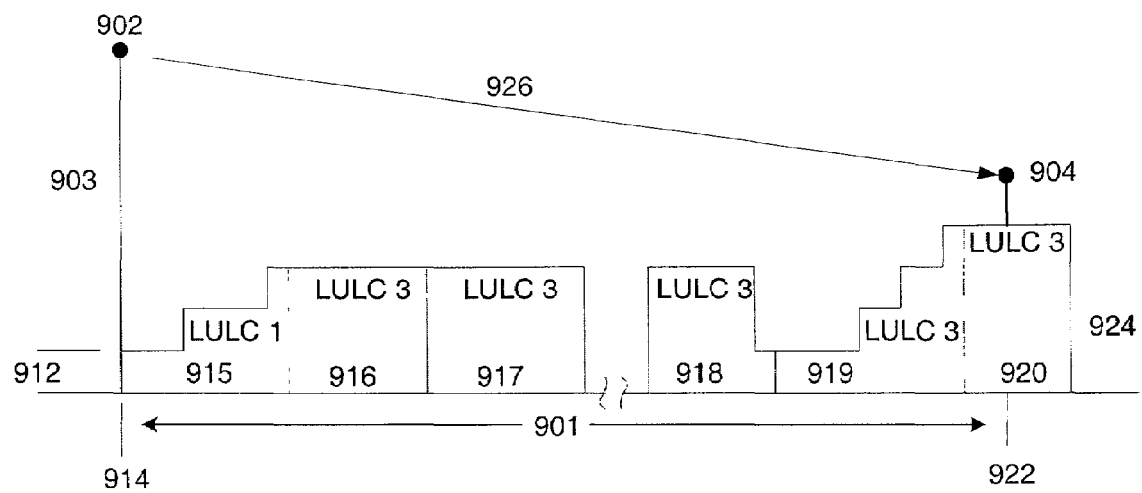

It may be helpful for the reader to visualize the radial distance 901 as a profile shown in FIG. 9B. The profile is achieved by taking a planar slice perpendicular to the earth's surface passing through both the base station 902 and the mobile unit 904. BSS 902 is positioned at location 914 having an elevation 912. The area from 914 through 915 steps up in elevation and has land cover #1. The land cover transitions to land cover #3 at map pixel 916. Mobile unit 904 is positioned at 922 at an elevation 924. Land cover #3 extends from map pixel 916 to map pixel 920 where the mobile antenna 904 is positioned at distance 901. There is a computable LOS distance 926 between the BSS 902 and the mobile antenna 904.

Exemplary Method for Computing Propagation Loss

Figure 10:
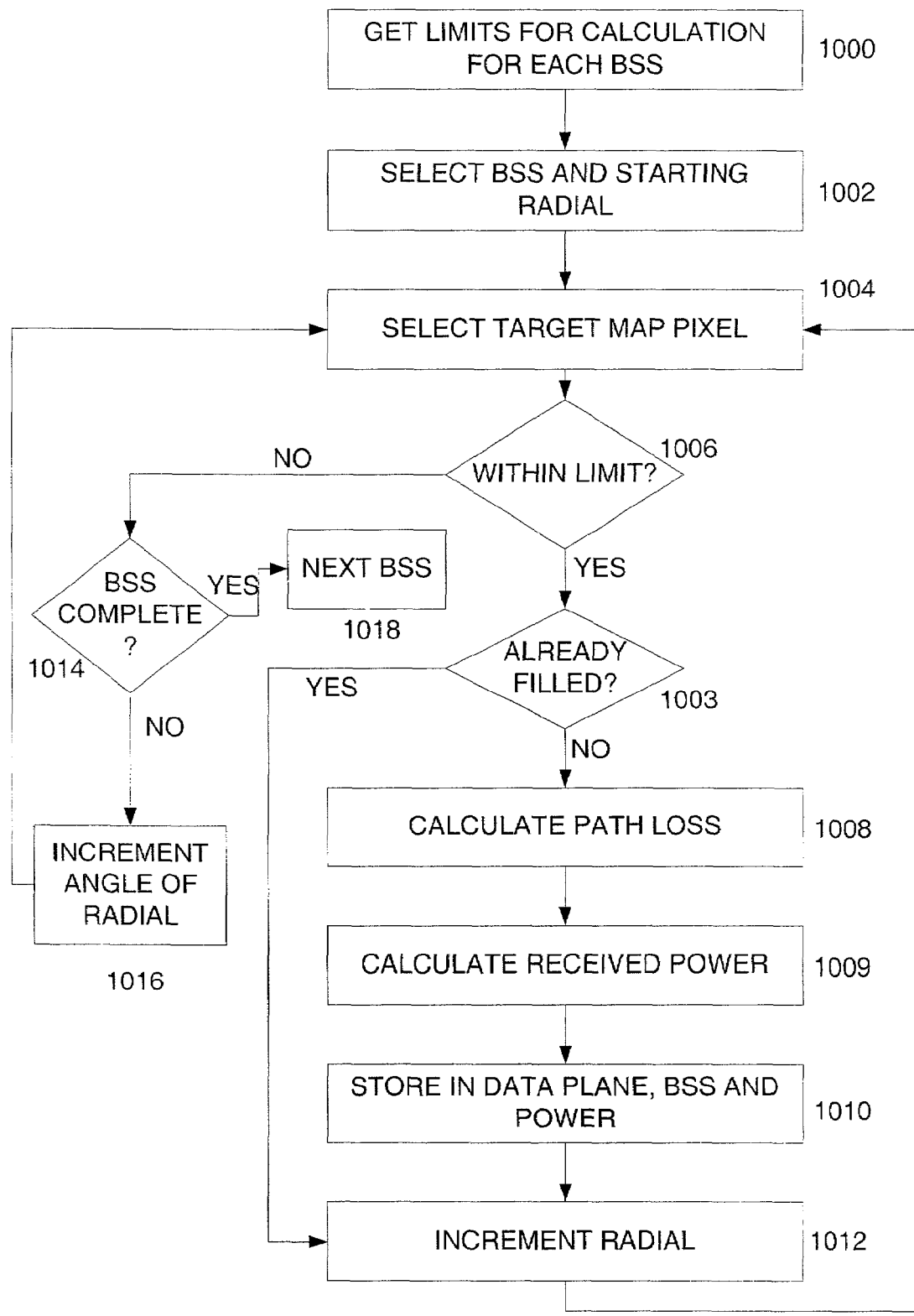
FIG. 10—illustrates a flow diagram of a method for computing propagation loss.

FIG. 10 presents a flow diagram showing a preferred method of computing the propagation path loss and the corresponding received power. In step 1000, the process retrieves the calculation parameters to be used such as the maximum radius from the base station (BSS). For each base station, the process initializes to a starting radial, step 1002. The process starts with closest map pixel, step 1004. Step 1006 determines if the map pixel is within the maximum radius, and if so, the process further determines if the received power for that pixel has been computed for this base station, step 1003. If the receive power has not been calculated for the pixel of interest, then the process computes the path loss for the map pixel of interest using the selected model, step 1008. Next, the received power is computed in step 1009 and the result is stored in the output variable data plane, step 1010. If the receive power has been computed, the process increments out along the radial in step 1012 and repeats. The process then increments the radial an additional pixel, and returns to step 1004.

When the process reaches the limit in step 1006, it checks to ensure that all radials required for the particular base station have been calculated, step 1014. If not, the angle of the radial is incremented, step 1016, and the propagation path loss for the pixels in the next radial are calculated. When calculations are completed for one base station, the process computes the necessary values for the next base station, step 1018. The process repeats until calculations have been performed for all relevant base stations within the selected coverage area.

To account for the overlap of base station service areas, the process is further enhanced to account for instances where the received power from one base station is recorded for a map pixel that can also be served by a second base station. Once the received power from the second base station is calculated, the two possible powers are compared. The larger value is stored as the received power from the best server, while the second largest is retained elsewhere in the database.

Exemplary Apparatus for Practicing Method

Figure 11:
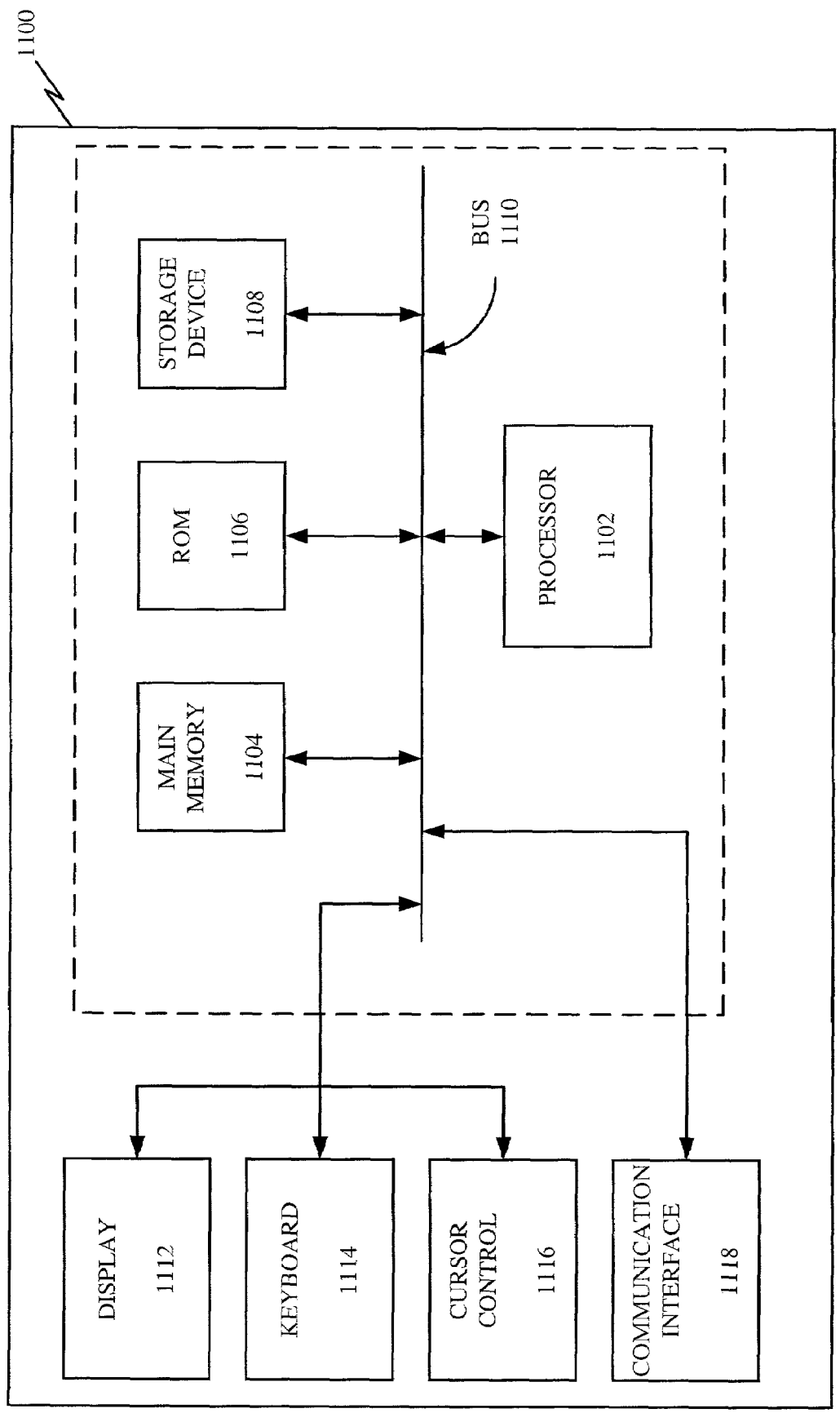
FIG. 11—is an illustration of a representative apparatus for performing invention.

FIG. 11 generally illustrates a computerized wireless network planning apparatus 1100 capable of performing the required operations necessary to practice the invention. Processor 1102 may be any type of conventional processing device that interprets and executes instructions. Main memory 1104 may be a random access memory (RAM) or a similar dynamic storage device. Main memory 1104 stores information and instructions executed by processor 1102. Main memory 1104 may also be used for storing temporary variables or other intermediate information during execution of instructions by processor 1102. ROM 1106 stores static information and instructions for processor 1102. It will be appreciated that ROM 1106 may be replaced with some other type of static storage device. The data storage device 1108 may include any type of magnetic or optical media and its corresponding interfaces and operational hardware. Data storage device 1108 stores information and instructions for use by processor 1102. Furthermore, main memory 1104, ROM 1106, and storage device 1108 can reside locally within the wireless network planning apparatus 1100, or they can reside remotely. If main memory 1104, ROM 1106 and storage device 1108 reside remotely, data necessary for proper operation of the wireless network planning apparatus 1100 will be communicated via a coupling means such as an Internet, intranet, telephone line, or wireless communications signal. Bus 1110 includes a set of hardware lines (conductors, optical fibers, or the like) that allow for data transfer among the components of the computerized wireless network planning apparatus 1100.

The display device 1112 may be a cathode ray tube (CRT), LCD, or the like, for displaying information to a user.

Alternatively, the display device 1112 can be omitted and any interim or final data normally displayed to an operator, can be sent to another output device such as a printer or hard disk. Keyboard 1114 and cursor control 1116 allow the user to interact with the wireless network planning apparatus 1100 while performing network planning. The cursor control 1116 may be, for example, a mouse. In an alternative configuration, the keyboard 1114 and cursor control 1116 can be replaced with a microphone and voice recognition means to enable the user to interact with the wireless network planning apparatus 1100.

Communication interface 1118 enables the wireless network planning apparatus 1100 to communicate with other devices/systems via any communications medium. For example, communication interface 1118 may be a modem, an Ethernet interface to a LAN, or a printer interface. Alternatively, communication interface 1118 can be any other interface that enables communication between the wireless network planning apparatus 1100 and other devices or systems.

Execution of the sequences of instructions contained in memory 1104 causes processor 1102 to perform the method as illustrated in FIG. 10, and the methods described hereinafter. For example, processor 1102 may execute instructions to perform the functions of propagation loss for roads, generation of vector features, and display of interim and final results. It will be obvious to practitioners in the art, that hard-wired circuitry may be used in place of, or in combination with, software instructions to implement the present invention. Thus, the present invention is not limited to any specific combination of hardware circuitry and software.

Propagation Loss for Vectors

When roads and other vectors are rasterized using prior art methods, the entire pixel containing a road is given a land use of open/road. It is known in the art that the attenuation factor for a road is equivalent to open space and less than that of other land cover types. When a road parallels a radial drawn from a base station, there is a path of low attenuation along the road. For a parallel radial, the low attenuation path can be many pixels in length. In contrast, if the road is perpendicular to the radial, only one map pixel will have the lower attenuation factor. In actual network planning, it is unlikely that a road will be perfectly parallel to a radial; therefore, for the disclosed invention parallel is defined as within a specified angle of deviation from the radial. Typically, a radial can deviates 10–20° from the angle of the road is still considered parallel to the road; however, angles outside the 10–20° range can also be used.

Figure 12:
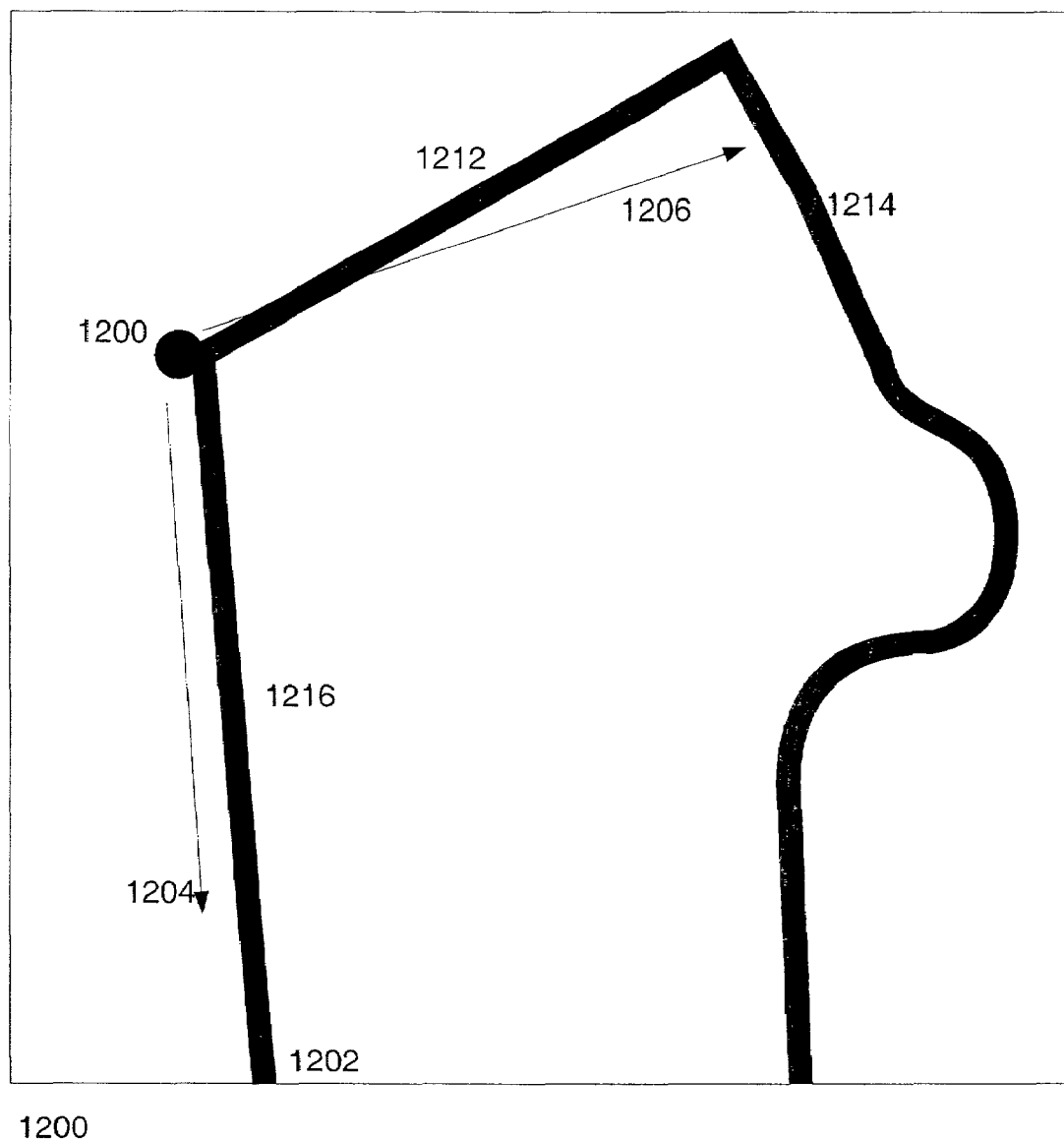
FIG. 12—provides a map showing road orientations.

FIG. 12, shows a map portion in which the road is both parallel to, and perpendicular to the radial emanating from the base station 1200. A road 1202 runs across FIG. 12 and passes along side base station 1200. Radial 1206 emanates from base station 1200 and runs toward the upper right corner of FIG. 12. Radial 1206 runs parallel to the road segment 1212, and it runs perpendicular to road segment 1214 which is located above the tip of radial 1206. Radial 1204 runs in a southerly direction and is parallel to road portion 1216. In flat terrain, a mobile unit located at the arrowhead of 1204 will have a clear line of sight to the base station, while a mobile at arrow head 1206, will likely be obstructed by the clutter along the radial such as buildings and trees. If standard map pixel resolution processing is used for propagation loss calculations, inaccurate results may be obtained.

Use of Vector Features

The present invention avoids the accuracy limitations encountered in network planning using pixel level resolution by using vector features and modifying calculations accordingly. When the propagation path loss to a vector feature is calculated, the raster propagation path loss model is refined to accommodate the greater accuracy of the vectors. This enables other parameters such as incremental (intra-pixel) elevation, incremental (intra-pixel) coordinates for features, and fine road resolution to be used when making propagation loss calculations. For example, the incremental elevation of a feature is added to the terrain elevation to provide a new mobile antenna height, the coordinates and resolution of the feature are also used to calculate the propagation path loss to the feature and to modify the land use average distribution to account for the placement of the vector. Using these additional parameters results in a more accurate solution.

Figure 13A:
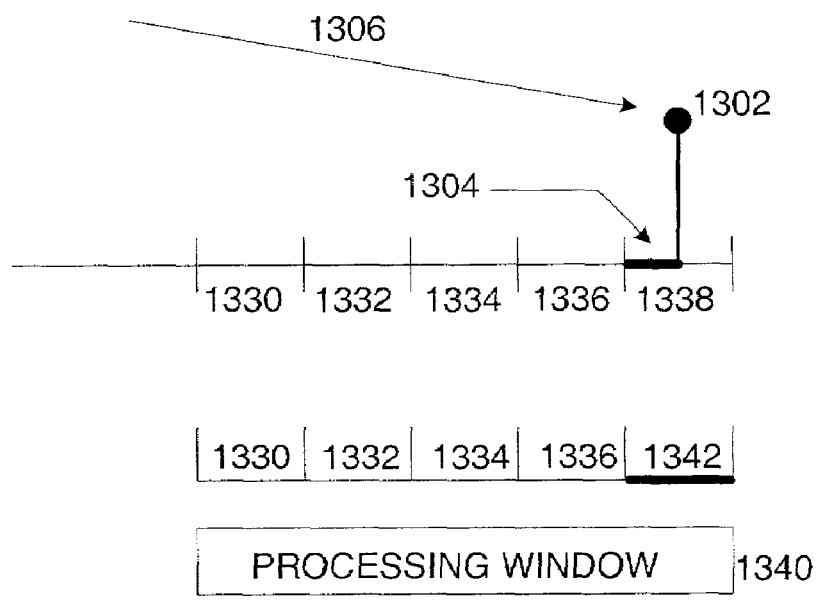
FIGS. 13A and 13B—illustrate the use of vector data.

FIGS. 13A and B illustrate the change in accuracy obtained using vector data and the disclosed method. In FIG. 13A, a base station signal 1306 is incident upon a mobile antenna 1302. The mobile antenna 1302 is located on road 1304 within map pixel 1338 where the land use average window (processing window) 1340 uses 5 map pixels 1330, 1332, 1334, 1336 and 1338. If vector features are not employed in the calculation, then for situations where the road is not parallel to the radial, map pixel 1338 is recognized as road, and the improved attenuation of a road is factored into the land use average distribution as a complete pixel 1342. Since roads are normally much narrower than a map pixel, errors are introduced.

Figure 13B:
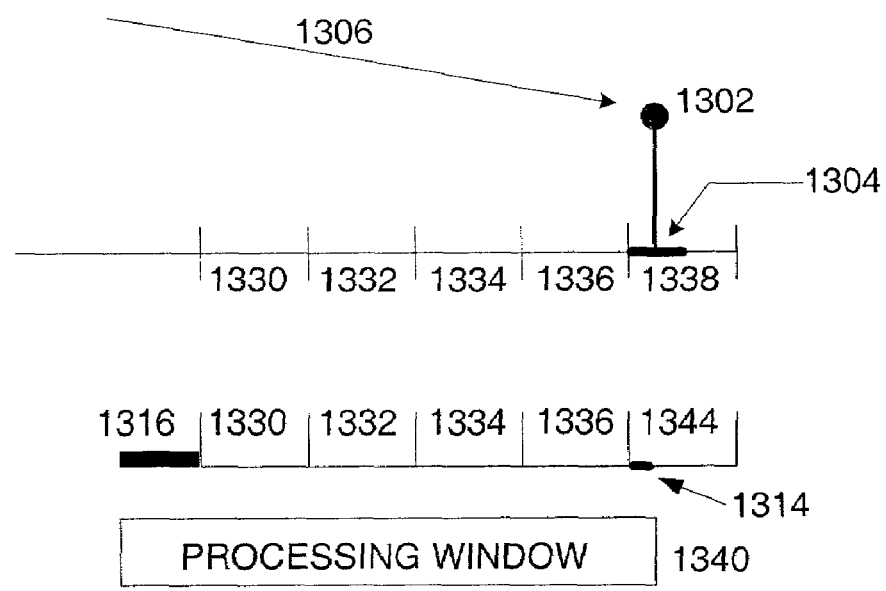

When the disclosed method is employed, as shown in FIG. 13B, the mobile antenna 1302 is placed in the center of the road 1304 at an elevation equal to the terrain elevation plus the vector elevation increment. Next, the weighted road attenuation factor is only applied to the half of the road width 1314 that is facing the base station. In order to maintain a processing window 1340 of 5 map pixels in length, the remaining map pixel width 1316 is averaged in as the low weight higher attenuation partial pixel.

Figure 14:
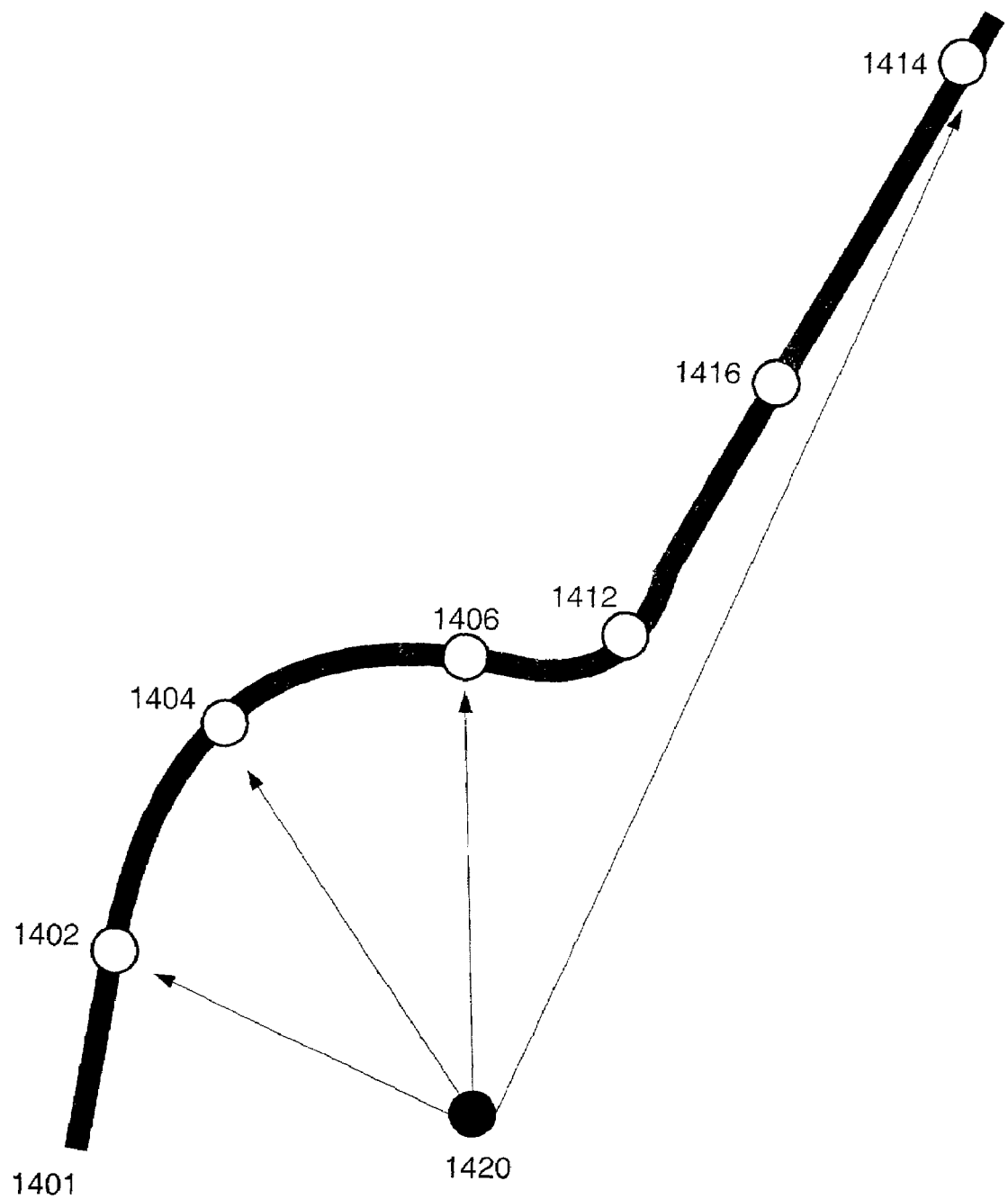
FIG. 14—is an illustration showing propagation losses for various road orientations.

FIG. 14 illustrates a road 1401 that is essentially perpendicular to radials 1402–1406 emanating from a base station 1420. After 1406, the road 1401 bends until it is essentially parallel to a radial extending to points 1412 through 1414. Computing the propagation path loss for perpendicular road points on radials 1402–1406 will be done as described above. In contrast, the propagation path loss for point 1414 uses the road attenuation factor for all the pixels along the vector and therefore shows significantly less signal attenuation at point 1414 than at point 1406. If the loss at a point between 1412 and 1414 is required, say point 1416, it can be determined by interpolating between points 1412 and 1414. For vectors, determining whether a vector is parallel to a radial is accomplished by comparing the angle of the vector to the angle of the radial. After the propagation path loss is calculated, the received power can be calculated using Eq. 1, shown previously.

Although the preferred embodiments of the invention have been illustrated and described in detail, it will be readily apparent to those skilled in the art that various modifications may be made therein without departing from the spirit of the invention or from the scope of the appended claims. For example, propagation loss parameters can be incorporated to better account for weather conditions, the size and shape of structures, vehicle density, etc. In addition, the system and method can be used to deal with aircraft on flight paths rather than vehicles on roads.

What is claimed is:

1. A method for simultaneously handling data planes for processing vector features in a wireless network planning system comprising:
   accepting a vector data plane and a raster data plane;
   utilizing a coordinate system stored as a coordinate system data plane;
   processing the vector data plane and the raster data plane using the coordinate system data plane to compute a distance to the vector feature that is within the boundaries of a pixel containing the vector feature;
      wherein the processing includes calculating a propagation loss for a wireless communications signal, and
      wherein the calculating comprises the steps of: determining a length of a radial from a base station to a mobile antenna; computing the propagation loss from said base station to an inner edge of a map pixel containing said mobile antenna; and determining a propagation loss from the inner edge of said map pixel containing said mobile antenna to a mobile antenna location using vector processing and a weighting function; and
   transferring the result to an output.

2. The method of claim 1, wherein the raster data plane includes at least one raster variable.

3. The method of claim 1, wherein the vector data plane includes at least one vector variable.

4. The method of claim 1, wherein the coordinate system data plane is comprised of a geographical coordinate system.

5. The method of claim 1, wherein the result is comprised of at least one data plane.

6. The method of claim 1, wherein the vector data plane and the raster data plane is accepted over a network.

7. The method of claim 1, wherein the output means is a network.

8. A method for simultaneously handling data planes for processing vector features in a wireless network planning system comprising:
   accepting a vector data plane and a raster data plane;
   utilizing a coordinate system stored as a coordinate system data plane;
   processing the vector data plane and the raster data plane using the coordinate system data plane to compute a distance to the vector feature that is within the boundaries of a pixel containing the vector feature;
      wherein the processing includes redistributing traffic within a sector onto vectors located within said sector and wherein said redistributing comprises: calculating the total traffic within said sector; determining a scaling factor; using said scaling factor to spread said traffic over at least one vector point within said sector; and spreading the remaining traffic over the pixels within the sector; and
   transferring the result to an output.

9. The method of claim 8, wherein the raster data plane includes at least one raster variable.

10. The method of claim 8, wherein the vector data plane includes at least one vector variable.

11. The method of claim 8, wherein the coordinate system data plane is comprised of a geographical coordinate system.

12. The method of claim 8, wherein the result is comprised of at least one data plane.

13. The method of claim 8, wherein the vector data plane and the raster data plane is accepted over a network.

14. The method of claim 8, wherein the output means is a network.

* * * * *